United States Patent [19]
Hartmann et al.

[11] Patent Number: 5,767,918
[45] Date of Patent: Jun. 16, 1998

[54] TELEVISION RECEIVER WITH A DEFLECTING OSCILLATOR THAT HAS THE ADDITIONAL FUNCTION OF CONTROLLING LINE GENERATORS THAT SUPERIMPOSE ALPHANUMERIC AND/OR GRAPHIC CHARACTERS ON THE SCREEN

[75] Inventors: Uwe Hartmann; Udo Mai; Fritz Ohnemus, all of Villingen-Schwenningen, Germany

[73] Assignee: Deutsche Thomson-Brandt GmbH, Hanover, Germany

[21] Appl. No.: 517,400

[22] Filed: Aug. 21, 1995

Related U.S. Application Data

[63] Continuation-in-part of Ser. No. 560,008, Jul. 25, 1990, abandoned.

[30] Foreign Application Priority Data

Oct. 11, 1986 [DE] Germany ............. 36 34 698.5

[51] Int. Cl.$^6$ .............. H04N 5/44; H04N 5/445
[52] U.S. Cl. .............. 348/563; 348/521; 348/536
[58] Field of Search ................. ; 348/510, 512, 348/516, 517, 521, 536, 540, 563, 564, 569, 570, 547, 549; H04N 5/44, 5/445

[56] References Cited

U.S. PATENT DOCUMENTS

| 5,051,817 | 9/1991 | Takano | 348/569 |
|---|---|---|---|
| 5,331,347 | 7/1994 | Wu | 348/547 |
| 5,353,066 | 10/1994 | Lee | 348/549 |
| 5,598,224 | 1/1997 | Choi | 348/564 |

FOREIGN PATENT DOCUMENTS

| 0094468 | 5/1986 | Japan | H04N 5/445 |
|---|---|---|---|

*Primary Examiner*—Michael H. Lee
*Assistant Examiner*—Linus H. Lo
*Attorney, Agent, or Firm*—Max Fogiel

[57] ABSTRACT

A television receiver providing a stable image whether or not a composite color signal is present, in which a transmitter-recognition processes the television synchronization signals of the composite color signal. A character generator displays alphanumeric as well as graphic characters. The deflection generators and the character generator are operative with TV signals as well as characters that are alphanumeric as well as graphic. The deflection generators and the character generator are driven by control signals. An oscillator controls the deflection generators, and a phase comparator operates in the presence of synchronization signals to synchronize the oscillator. The phase comparator receives no signals from the input terminal when no synchronization signals are present, so that the oscillator oscillates at a fixed preadjustable frequency to provide a stable image.

8 Claims, 3 Drawing Sheets

TELEVISION RECEIVER WITH A DEFLECTING OSCILLATOR THAT HAS THE ADDITIONAL FUNCTION OF CONTROLLING LINE GENERATORS THAT SUPERIMPOSE ALPHANUMERIC AND/OR GRAPHIC CHARACTERS ON THE SCREEN

This is a continuation-in-part of Ser. No. 560,008 filed Jul. 25, 1990, abandoned.

BACKGROUND OF THE INVENTION

The invention concerns a television receiver with a deflecting oscillator that has the additional function of controlling character generators that superimpose alphanumeric and/or graphic characters on the screen.

SUMMARY OF THE INVENTION

To ensure stable display of the characters, the character generators must be controlled in synchronization with the deflection of the electron beams and the deflecting oscillator must oscillate at a stable frequency. The object of the invention is to provide a steady oscillator signal for the characters.

One embodiment of the invention will now be described with reference to the drawing.

DESCRIPTION OF THE PREFERRED EMBODIMENT

Figure 1:
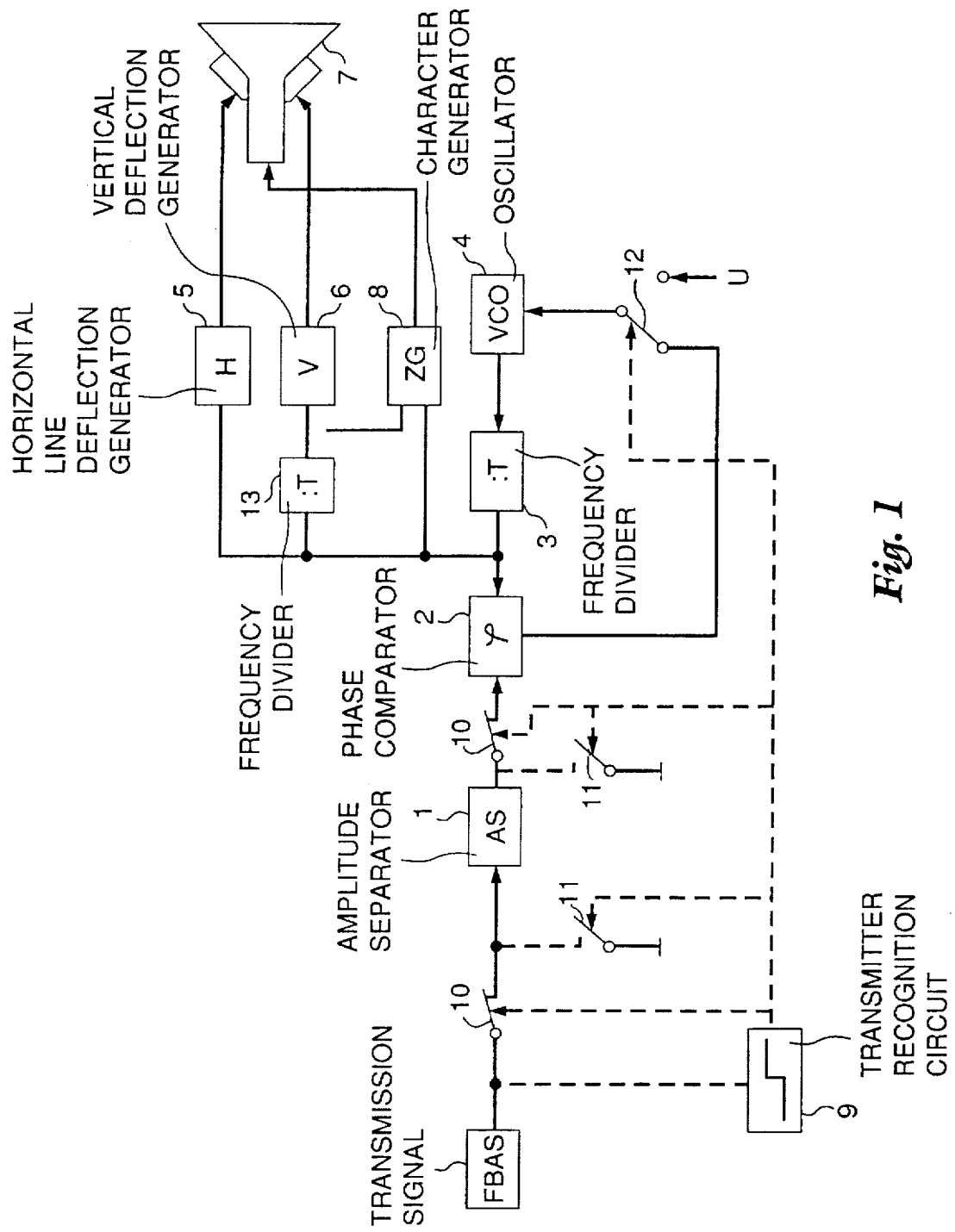
FIG. 1 is a schematic view and shows the essential elements of the arrangement in accordance with the present invention.

A composite color signal FBAS is switched to the input terminal of an amplitude separator 1. The synchronization pulses selected by the amplitude separator are compared in a phase comparator 2 with a frequency that has been derived from a deflection-generator oscillator 4 and separated by a frequency divider 3.

The phase comparison supplies control voltage for oscillator 4 in a known way. The oscillator frequency is utilized to start deflection generators 5 and 6 through electron-beam frequency dividers 3 and 13 in a picture tube 7 and to control a character generator 8. The character generator can, for example, be part of a videotext decoder, a teletex decoder, or a computer connected to the receiver. A transmitter-recognition circuit 9 processes the television synchronization signals. If there are none, circuit 9 will either open a contact 10, blocking composite color signal FBAS, or close a contact 11, short-circuiting the signal directly at the input terminal of amplitude separator 1. This interruption or short-circuiting can also occur at the output terminal of amplitude separator 1, causing phase comparator 2 to release a specific constant voltage to oscillator 4, which will accordingly oscillate stably at a constant frequency. Transmitter-recognition circuit 9 can also switch the control input terminal of oscillator 4 over to a constant voltage through a contact 12, processing only the emitter synchronization signals with no need to coincide with the flyback pulses generated in the receiver. This type of circuit 9 is described in German OS 3 508 527 for example. This German OS 3 508 527 is confined to disclosing a transmission recognition circuit which processes only the synchronizing signals of the transmitted signal, without requiring a coincidence with the feedback signals produced in the receiver. This German OS 3 508 527 corresponds therefore only to the circuit 9.

Figure 2:
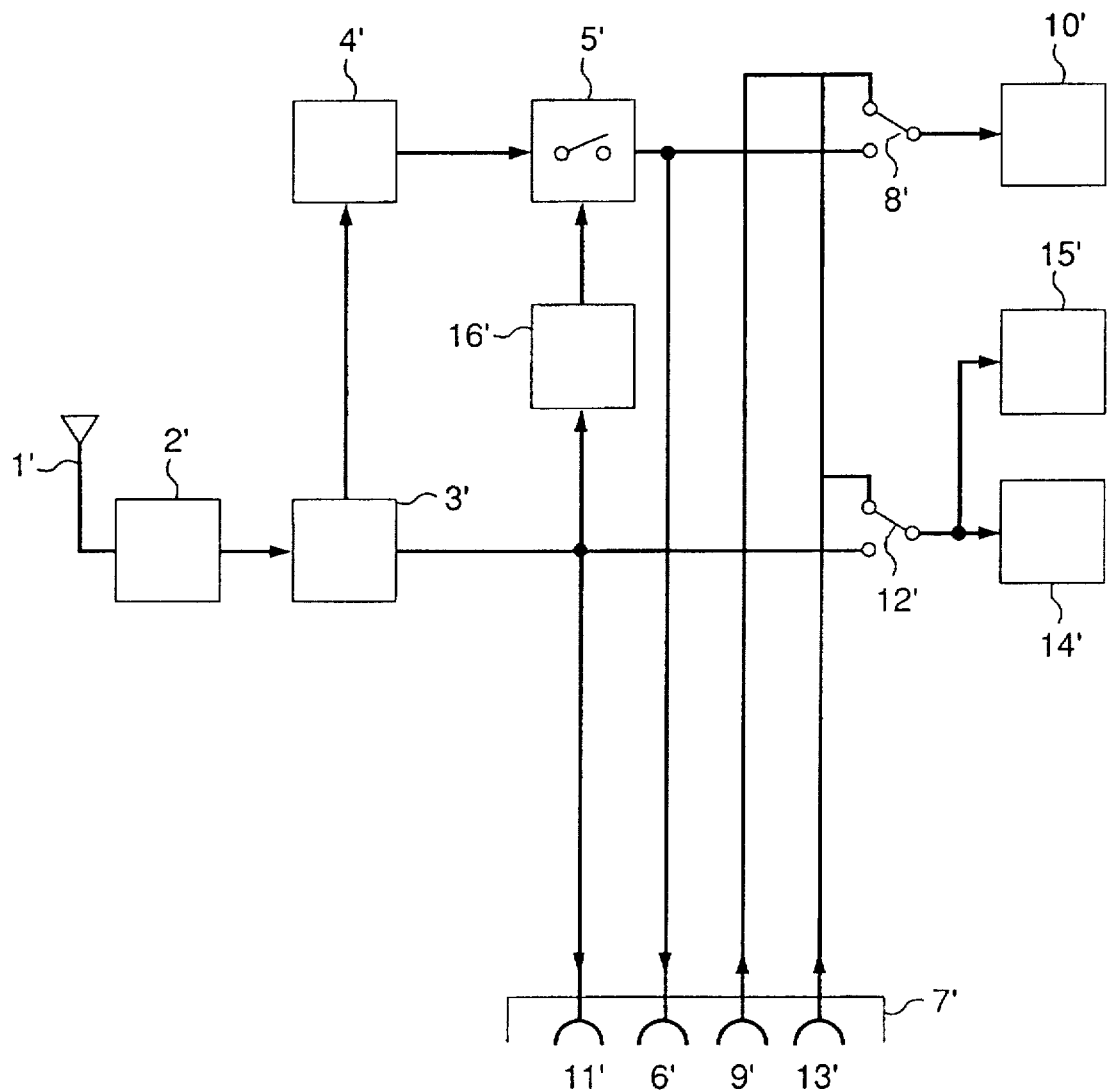
FIG. 2 is a schematic view of a transmitter recognition circuit shown in FIG. 1.
Figure 3:
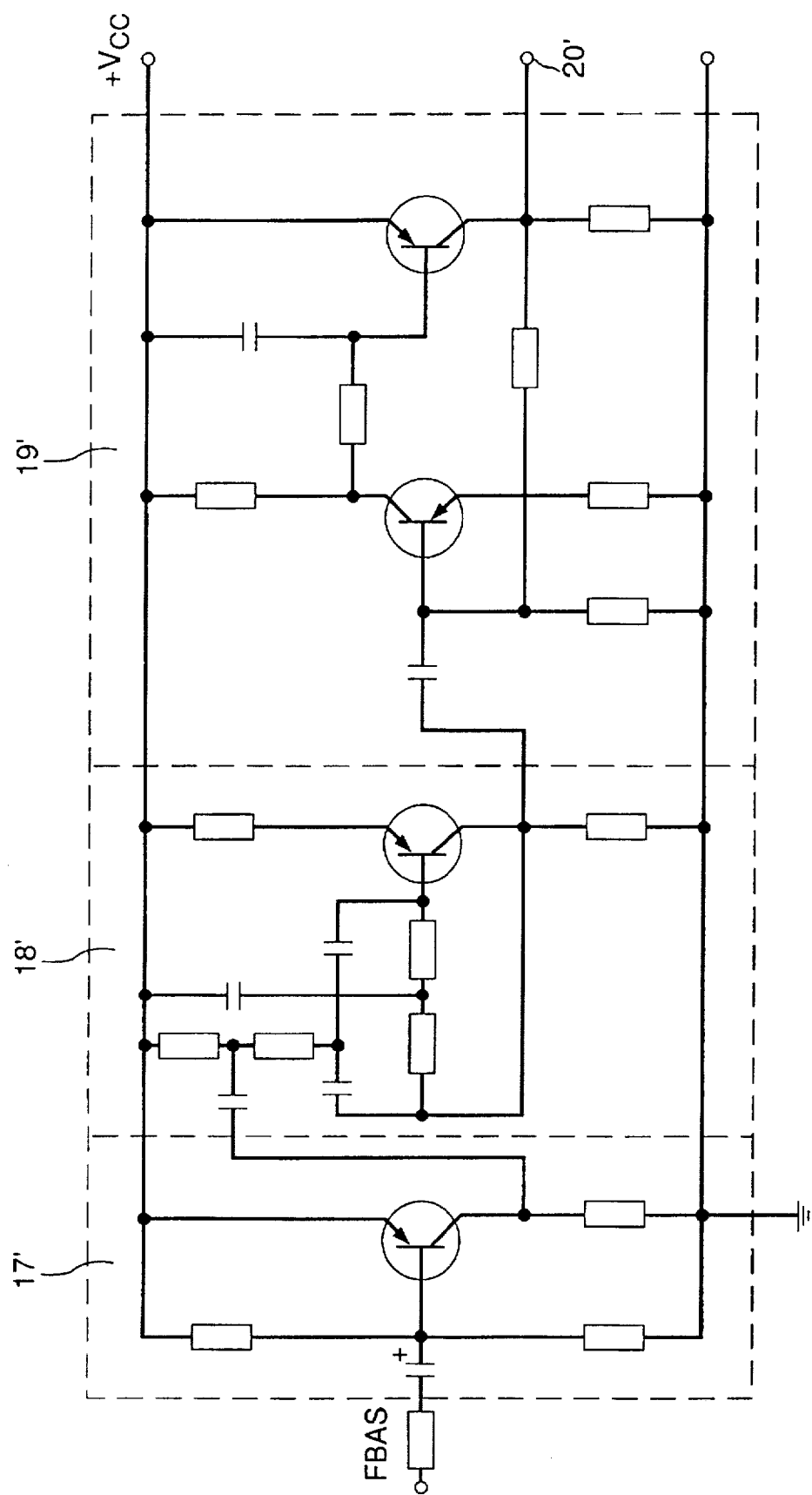
FIG. 3 is a schematic of a circuit for actuating a gate shown in FIG. 2.

The circuit described in German OS 3 508 527 is shown furthermore in FIGS. 2 and 3 and described there as follows:

An HF signal received by the aerial 1' reaches the tuner 2' and goes from there to the IF stage 3', from which the sound channel and the video channel branch off. The sound signal goes via a sound IF stage 4' and a gate circuit 5' to a contact 6' of a socket 7' leading out for connection of e.g. a headset and to a contact of a changeover switch 8'. The other contact of switch 8' is connected to an input connector 9', from which the sound signals to the sound stage 10' of the receiver can be switched. From the IF stage 3' the video signal reaches a contact 11' leading out, and a contact of a further switch 12', of which the other contact is connected to an input connection 13'. The input and output connections 9', 13' and 6, 11' serve for connection of the peripheral devices with the receiving apparatus. The changeover switch 12' is connected to the video signal stages 14' and the circuits 15' responsible for the deflection of the electron beams in the picture tube. The control signal for the actuation of the gate 5' is obtained from the IF signal and process in a stage 16' which is described in detail in FIG. 3.

First the FBAS signal goes via a pulse separation stage 17' to a filter circuit 18' tuned to the line pulse frequency, and this is shown in the sample as a double-T RC filter. Any other selector circuit is possible, such as e.g. an LC resonant circuit, which is, however, not so cost effective as an RC network. Magnetic interference can also have a deleterious effect on the suppressor circuit. A switching stage 19' connected to the filter circuit 18' and having hysteresis behavior produces at the output 20' of the switching stage 19', a signal for control of the gate circuit 5' only in the presence of periodically occurring pulses, in a narrowly toleranced frequency range.

The advantage of the invention is that oscillator 4 will remain at a constant frequency as long as there is no emitter signal during both the forward and the backward stroke of the electron beams. If transmitter-recognition circuit 9 detects television signals, their synchronization pulses will again assume synchronization. Since this occurs only once, interference will no longer have any effect. The recognition circuit can be either integrated in with the other character generator control stages or a separate component. Many other measures for switching oscillator 4 over are also conceivable.

The present invention is concerned with a system which allows reproduction of graphic characters together with a video picture derived from a composite color signal.

For purposes os succinctness applicant's description of the invention as well as FIG. 1 are restricted to the system for reproducing graphic characters. The steps and connections for relationships that are needed for picture or video reproduction are not described or illustrated, because they are not a part of the present invention.

For picture or video reproduction, the picture content must be selected from the composite color signal which, among other conditions, is applied to the amplitude filter 1, as well as the stage 9, in accordance with FIG. 1. The picture tube must then be controlled correspondingly. Furthermore, for picture reproduction that is free of disturbances and interferences, it is necessary that a vertical synchronizing pulse of the composite color signal, which, for example, can be filtered out by the amplitude filter 1, be applied to the vertical deflection generator 6. The vertical synchronizing pulse is required there for picture start recognition.

The additional apparatus and means that are necessary for the reproduction of video pictures that are derived from the composite color signal, need not be discussed further, since they are a part of the well-known prior art.

It is essential to note that applicant's arrangement makes it possible to reproduce graphic characters, regardless of whether or not a composite color signal is present.

Character generators that are known in the art, contain a memory and an oscillator which cannot be synchronized as well as applicant's oscillator 4. Thus, applicant's oscillator VCO 4 becomes stable faster under variations of the synchronizing pulses, than the oscillator of the character generator 8. As a result, applicant's invention provides that the oscillator in the character generator is controlled by applicant's VCO 4, through the frequency divider 13. Such character generator 8 is a part of the prior art, for example. Sudden variations of the synchronization (whether the composite color signal is present or not) influence the VCO 4 which is in the position to become rapidly synchronized.

Applicant's oscillator VCO 4 can thereby be considered a "master oscillator", and the oscillator in the character generator 8 which is to be trimmed thereto, can be considered a "slave oscillator."

We claim:

1. Television receiver providing a stable image whether or not a composite color signal is present, comprising:

an input terminal for receiving a composite color signal FBAS, a transmitter-recognition circuit for processing the television synchronization signals and recognizing said signals of the composite color signal FBAS, deflection generators for deflecting an electron beam in a picture tube, and a character generator for displaying alphanumeric as well as graphic characters, characterized by said deflection generators and said character generator being operative with TV-signals as well as characters that are alphanumeric characters as well as graphic characters, said deflection generators and said character generator being driven by control signals; an oscillator with output for controlling said deflection generators; a phase comparator for operating in the presence of synchronization signals to synchronize said output of said oscillator by said synchronization signals through said transmitter recognition circuit; said phase comparator receiving no signals from said input terminal when no synchronization signals are recognized through said transmitter recognition circuit so that said output of said oscillator oscillates at a fixed frequency; said deflection generators comprising a horizontal deflection generator and a vertical deflection generator; said oscillator being connected to said character generator as well as to said horizontal deflection generator and to said vertical deflection generator to produce said control signals from a common control signal of said oscillator when synchronization signals are present and also when synchronization signals are not present; and means for connecting said oscillator with a pre-adjustable control voltage when synchronization signals are not present so that said oscillator oscillates at a fixed preadjustable frequency obtained from said pre-adjustable control voltage for providing a stable image.

2. A television received as defined in claim 1, including an amplitude separator delivering synchronization signals and having an output blocked by said transmitter recognition circuit when synchronization signals are not present.

3. A television receiver as defined in claim 1, including an amplitude separator delivering synchronization signals and having an output short-circuited by said transmitter recognition circuit when synchronization signals are not present.

4. A television receiver as defined in claim 1, including an amplitude separator delivering synchronization signals and having an in put blocked by said transmitter recognition circuit when synchronization signals are not present.

5. A television receiver as defined in claim 1, including an amplitude separator delivering synchronization signals and having an input short-circuited by said transmitter recognition circuit when synchronization signals are not present.

6. Television receiver providing a stable image whether or not a composite color signal is present, comprising:

an input terminal for receiving a composite color signal FBAS, a transmitter-recognition circuit for processing the television synchronization signals and recognizing said signals of the composite color signal FBAS, deflection generators for deflecting an electron beam in a picture tube, and a character generator for displaying alphanumeric as well as graphic characters, characterized by said deflection generators and said character generator being operative with TV-signals as well as characters that are alphanumeric characters as well as graphic characters, said deflection generators and said character generator being driven by control signals; an oscillator with output for controlling said deflection generators; a phase comparator for operating in the presence of synchronization signals to synchronize said output of said oscillator by said synchronization signals through said transmitter recognition circuit; said phase comparator receiving no signals from said input terminal when no synchronization signals are recognized through said transmitter recognition circuit so that said output of said oscillator oscillates at a fixed frequency; said deflection generators comprising a horizontal deflection generator and a vertical deflection generator; said oscillator being connected to said character generator as well as to said horizontal deflection generator and to said vertical deflection generator to produce said control signals from a common control signal of said oscillator when synchronization signals are present and also when synchronization signals are not present; and means for connecting said oscillator with a pre-adjustable control voltage when synchronization signals are not present so that said oscillator oscillates at a fixed preadjustable frequency obtained from said pre-adjustable control voltage for providing a stable image; a frequency divider connected to said oscillator; an amplitude separator for receiving said composite color signal and selecting synchronization signals for comparing in said phase comparator with a frequency derived from said oscillator and separated by said frequency divider; said phase comparator supplying said control voltage for controlling said oscillator so that said oscillator is in phase with said synchronization signals; first switching means between said amplitude separator and said phase comparator to block said composite color signal; second switching means connected to said amplitude separator for short-circuiting selectively an input and output of said amplitude separator; said means for connecting said oscillator with a pre-adjustable control voltage comprising third switching means; said first switching means, said second switching means and said third switching means preventing noise leading to an unstable image from entering said phase comparator.

7. A television receiver as defined in claim 6, wherein said first, second and third switching means are actuated by an output of said transmitter recognition circuit.

8. A television receiver as defined in claim 6, wherein said frequency divider is connected between said oscillator and said phase comparator.

* * * * *